(12) United States Patent
Nishino et al.

(10) Patent No.: US 8,573,089 B2
(45) Date of Patent: Nov. 5, 2013

(54) SPEED CHANGE OPERATION APPARATUS FOR STEPLESS SPEED CHANGER DEVICE

(75) Inventors: Akifumi Nishino, Sakai (JP); Kiyokazu Nakanishi, Kawachinagano (JP); Shinichi Morita, Sakai (JP)

(73) Assignee: Kubota Corporation, Osaka (JP)

( * ) Notice: Subject to any disclaimer, the term of this patent is extended or adjusted under 35 U.S.C. 154(b) by 296 days.

(21) Appl. No.: 13/052,904

(22) Filed: Mar. 21, 2011

(65) Prior Publication Data

US 2012/0024100 A1 Feb. 2, 2012

(30) Foreign Application Priority Data

Jul. 28, 2010 (JP) .................................. 2010-169590

(51) Int. Cl.
*G05G 5/03* (2008.04)

(52) U.S. Cl.
USPC ........... 74/469; 74/473.16; 74/473.1; 74/567; 74/569

(58) Field of Classification Search
USPC ........... 74/469, 473.16, 473.1, 478, 567–569; 180/336
See application file for complete search history.

(56) References Cited

U.S. PATENT DOCUMENTS

| | | | |
|---|---|---|---|
| 2,557,795 A * | 6/1951 | Price | ............................... 477/81 |
| 3,863,520 A | 2/1975 | Moline et al. | |
| 4,140,436 A | 2/1979 | Schumacher et al. | |
| 4,485,689 A | 12/1984 | Cambria | |
| 5,207,740 A | 5/1993 | Ikushima et al. | |
| 5,263,385 A | 11/1993 | Hirata et al. | |
| 6,347,560 B1 * | 2/2002 | Maezawa et al. | .......... 74/473.16 |
| 7,337,870 B2 * | 3/2008 | Izukura et al. | ................. 180/307 |
| 7,458,438 B2 | 12/2008 | Nishino et al. | |
| 7,954,592 B2 * | 6/2011 | Miyazaki et al. | .............. 180/321 |
| 8,113,080 B2 * | 2/2012 | Nishino | ..................... 74/473.16 |
| 8,220,582 B2 * | 7/2012 | Toyokawa et al. | ............. 180/336 |
| 2006/0081084 A1 * | 4/2006 | Nishino et al. | ................ 74/473.1 |
| 2009/0044652 A1 * | 2/2009 | Nishino | ..................... 74/473.16 |
| 2010/0101887 A1 * | 4/2010 | Kawashiri et al. | ............. 180/335 |

FOREIGN PATENT DOCUMENTS

JP 200948331 A 3/2009

* cited by examiner

*Primary Examiner* — Troy Chambers
*Assistant Examiner* — Valentin Craciun
(74) *Attorney, Agent, or Firm* — The Webb Law Firm

(57) ABSTRACT

A speed change operation apparatus includes a pivotal body operatively connected to a trunnion shaft to be pivotally displaced in response to an operational displacement by an operational tool, a positioning body operatively coupled with the pivotal body so as to be pivotally displaced in response to a pivotal displacement of the pivotal body, a main urging mechanism for applying an urging force to the pivotal body via the positioning body for returning the pivotal body from an operational position to the neutral position, and an auxiliary urging mechanism for applying an auxiliary urging force to the pivotal body for returning the pivotal body from the operational position to the neutral position.

7 Claims, 12 Drawing Sheets

Fig.12

| operational position of trunnion shaft (11) | forward travel side highest speed position (Fmax) | neutral position (N) | reverse travel side highest speed position (Rmax) |
|---|---|---|---|
| pressing force by first spring (33) (F1,F2,F3) | 10 | 8 | 10 |
| rotational resistance of trunnion shaft (11) (M1,M2,M3) | 7 | 10 | 7 |
| component force of operating force of second spring (34) (F4a,F5a,F6a) | 1.5 | 0.75 | 1.5 |
| pressing force of positioning body (32) (M4,M5,M6) | 6 | 2 | 6 |
| speed change operational resistance | 13 | 12 | 13 |

US 8,573,089 B2

SPEED CHANGE OPERATION APPARATUS FOR STEPLESS SPEED CHANGER DEVICE

BACKGROUND OF THE INVENTION

1. Field of the Invention

The present invention relates to a speed change operation apparatus for a stepless speed changer device, configured to increase a rotational output in response to increase in rotational displacement of a trunnion shaft from a neutral position to an operational position.

2. Description of the Related Art

According to one type of speed change operation apparatus, the apparatus includes a pivotal body operably coupled to a trunnion shaft, a positioning body supported to be pivotable about a positioning axis parallel with a pivot axis of the pivotal body, and a cam mechanism for positioning the trunnion shaft at the neutral position. At the time of positioning, into a recessed portion of a cam (a constituent element of a cam mechanism) formed in one of the pivotal body and the positioning body, a cam follower (another constituent element of the cam mechanism) is engaged. And, the positioning body is pivotally urged by a spring so as to bring the cam and the cam follower into contact with other.

For instance, a speed change operation apparatus disclosed in Japanese Unexamined Patent Application Publication No. 2009-48331 includes a first member as a pivotal body operably coupled to a trunnion shaft, a second member as a positioning body and a spring and an auxiliary spring that pivotally urge the second member. The spring is connected to the second member and pivots the second member with an urging force that progressively increases as the trunnion shaft reaches the higher speed side. The auxiliary spring is connected to a rod having one end thereof engaged in a cam hole formed in the second member. The rod is supported to be pivotable with the portion thereof opposite to the side engaged in the cam hole acting as the pivot. When the trunnion shaft is located at a neutral position or an area adjacent the neutral position, one terminal end of the rod contacts an inclined portion of the cam hole by the urging force of the auxiliary spring, thereby to press the second member toward the first member. When the trunnion shaft is located at a distant area more distant from the neutral position than the adjacent area, the one terminal end of the rod is pressed against an arcuate portion of the cam hole by the urging force of the auxiliary spring. That is, while the trunnion shaft is located in the adjacent area, the urging force of the auxiliary spring urges the trunnion shaft to the neutral position. Whereas, while the trunnion shaft is located at the distant area, the urging force of the auxiliary spring does not urge the trunnion shaft to the neutral position. With this speed change operation apparatus, even with appropriate setting of the urging force applied to the positioning member when the trunnion shaft is located at the neutral position and the urging force applied to the positioning member when the trunnion shaft is located at a highest speed position, the urging force of the spring becomes weaker as the trunnion shaft is located closer to the neutral position. Further, the urging force of the auxiliary spring is applied to the positioning member for only a portion in the operational range of the trunnion shaft adjacent the neutral. Because of these two respects, in the course of an operation of the trunnion shaft from one of the neutral position and the highest speed position to the other, there occurs change in the pressing force applied from the positioning member to the pivotal body, thus tending to invite change in the rotational resistance of the trunnion shaft. As a result, there arises a problem of variation occurring in the operational resistance.

SUMMARY OF THE INVENTION

The object of the present invention is to provide a speed change operation apparatus for a stepless speed changer device that is capable of effecting, with high precision, urging of the trunnion shaft to the neutral position and that provides good speed change operation performance.

For accomplishing the above-noted object, a speed change operation apparatus according to the present invention comprises:

an operational tool whose operational displacement causes rotational displacement of a trunnion shaft between a neutral position and an operational position;

a pivotal body operably coupled with the trunnion shaft to be pivotally displaced in response to an operational displacement of said operational tool;

a positioning body operably coupled with said pivotal body to be pivotally displaced in response to pivotal displacement of said pivotal body;

a main urging mechanism for providing an urging force to said pivotal body via said positioning body, said urging force returning said pivotal body from the operational position to the neutral position; and an auxiliary urging mechanism for providing an auxiliary urging force to said pivotal body, said auxiliary urging force returning said pivotal body from the operational position to the neutral position;

wherein a returning (neutral maintaining) urging force provided by the main urging mechanism at the neutral position of the trunnion shaft is stronger than a returning urging force provided by the main urging mechanism at the operational position of the trunnion shaft; and wherein an auxiliary urging force provided by the auxiliary urging mechanism at the neutral position of the trunnion shaft is weaker than an auxiliary urging force provided by the auxiliary urging mechanism at the operational position of the trunnion shaft.

With the above construction, with optimization of application of force to the pivotal body through cooperative action of the main urging mechanism and the auxiliary urging mechanism, it becomes possible e.g.:

(1) to decrease variation in the operational force through the entire operational range of the stepless speed changer device;

(2) to progressively increase the operational force as the stepless speed changer device is operated toward the maximum speed side.

Further, with an arrangement for allowing ready adjustment of the auxiliary urging force of the auxiliary adjusting mechanism from outside the apparatus, it becomes possible to optimize the operational force of the operational tool as desired to suit each operator's preference.

According to another speed change operation apparatus of the present invention, the apparatus comprises:

a pivotal body operably coupled with the trunnion shaft;

a positioning body supported to be pivotable about a positioning axis extending parallel with a pivotal axis of the pivotal body;

a cam mechanism for positioning the trunnion shaft at the neutral position through engagement of a recessed portion of a cam and a cam follower, said cam being formed in one of the pivotal body and the positioning body, said cam follower being formed in the other of the pivotal body and the positioning body;

first and second springs that pivotally urge the positioning body in a pivotal direction for bringing the cam follower and the cam into contact with each other;

wherein said cam is configured to vary a rotational resistance of the trunnion shaft over the entire operational range of the trunnion shaft in such a manner that the rotational resistance becomes maximum when the cam follower disengages from the recessed portion and the rotational resistance progressively decreases as the cam follower moves away from the recessed portion after its disengagement therefrom; and wherein said second spring and said positioning body are operably coupled with each other to vary a pressing force applied from the positioning body to the pivotal body through pivotal urging of the positioning body by the second spring in such a manner that the pressing force becomes minimum when the trunnion shaft is located at the neutral position and the pressing force progressively increases as the trunnion shaft approaches a highest speed position.

With the above-described construction, in response to pivotal urging of the positioning body by the first spring, the positioning body is pressed against the pivotal body to bring the cam and the cam follower into contact with each other; and also, in response to pivotal urging of the positioning body by the second spring, the positioning body is pressed against the pivotal body to bring the cam and the cam follower into contact with each other, whereby the trunnion shaft is urged toward the neutral position. And, the pivotal urging of the positioning body by the first spring varies a rotational resistance of the trunnion shaft over the entire operational range of the trunnion shaft in such a manner that the rotational resistance becomes maximum when the cam follower disengages from the recessed portion and the rotational resistance progressively decreases as the cam follower moves away from the recessed portion after its disengagement therefrom. On the other hand, the pivotal urging of the positioning body by the second spring varies a pressing force applied from the positioning body to the pivotal body in such a manner that the pressing force becomes minimum when the trunnion shaft is located at the neutral position and the pressing force progressively increases as the trunnion shaft approaches a highest speed position. Therefore, it is possible to cause the rotational resistance that occurs due to the pivotal urging of the positioning body by the first spring and the pivotal urging of the positioning body by the second spring not to change at all or not to change much. Hence, even when an arrangement is made to allow neutral urging force of an appropriate magnitude to be applied to the trunnion shaft, whether the trunnion shaft is operated to the neutral position, the highest speed position or any operational position in its operational range, it is possible to operate the trunnion shaft through the entire operational range thereof, without significant increase or decrease in the operational resistance received due to the neutral urging of the trunnion shaft between the neutral position and the highest speed position.

Therefore, the trunnion shaft can be returned to the neutral position with an urging force of appropriate strength and can be maintained at the neutral position in a stable manner. At the same time, superior operational performance for providing smooth speed change operations can be realized with no or less change in the operational resistance over the entire operational range of the trunnion shaft.

BRIEF DESCRIPTION OF THE DRAWINGS

FIG. 12 is an explanatory view showing relationship among an operational position of the trunnion shaft, a pressing force of a first spring, a rotational resistance of the trunnion shaft, a component force of a second spring, a pressing force of a positioning body and a speed change operational resistance.

DETAILED DESCRIPTION OF THE PREFERRED EMBODIMENTS

Next, preferred embodiments of the present invention will be described with reference to the accompanying drawings.

Figure 1:
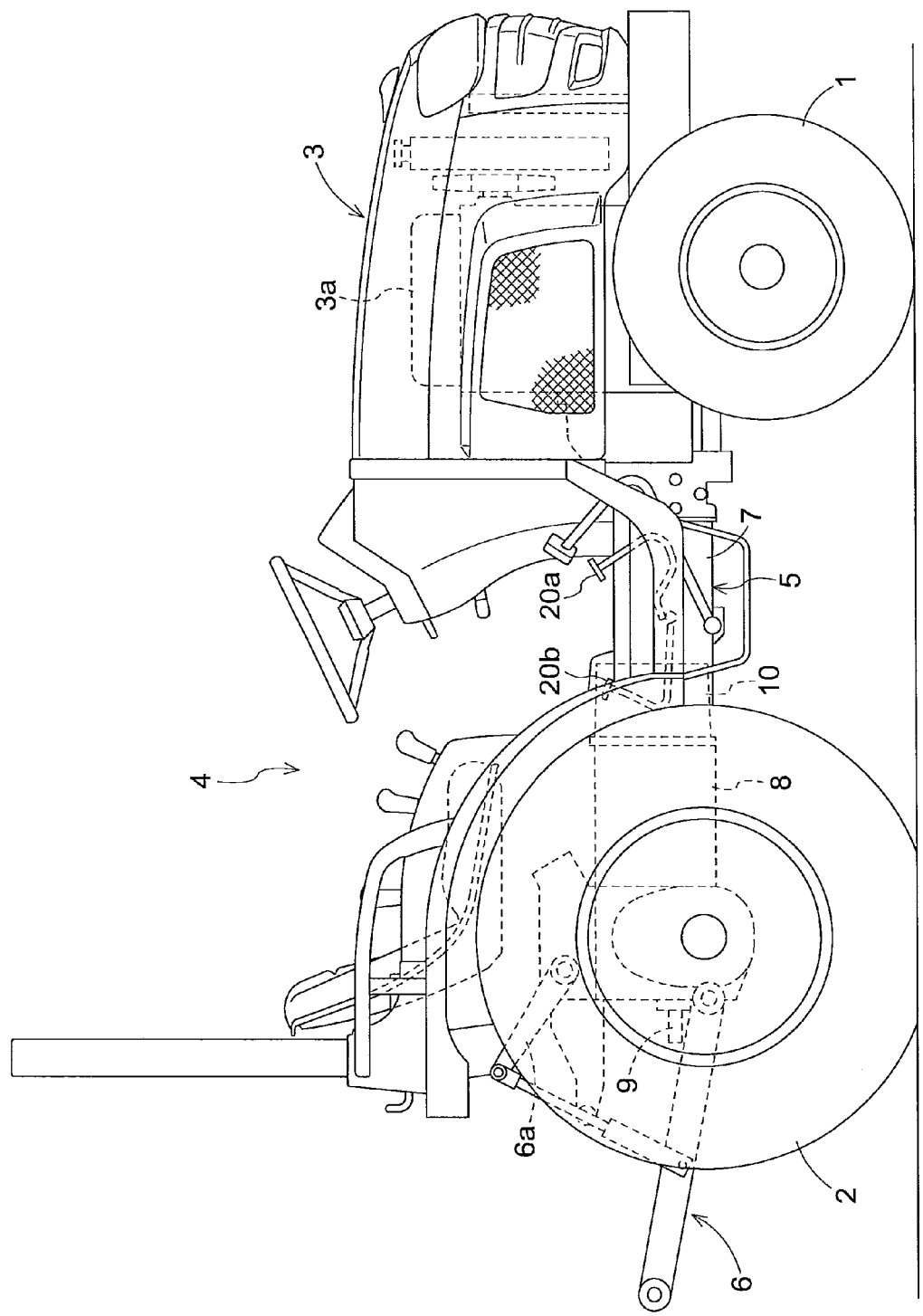
FIG. 1 is a side view showing a tractor in its entirety.

FIG. 1 is a side view showing, in its entirety, a tractor equipped with an HST 10 to which the speed change operation apparatus relating to the present invention is applied. The tractor includes a pair of front wheels 1, 1 as steering wheels and driving wheels, a pair of right and left rear wheels 2, 2 as driving wheels, an engine section 3 provided at a front portion of the vehicle body supported by the front and rear wheels, and a riding type driving section 4 provided at a rear portion of the vehicle body. To a rear portion of a vehicle body frame 5 of this tractor, there is attached a link mechanism 6 having a pair of right and left lift arms 6a pivotally liftable up/down, and at a rear portion of the vehicle body frame 5, there is mounted a power takeoff (PTO) shaft 9.

To this tractor, at its rear portion of the vehicle body for instance, a rotary cultivator unit (not shown) is connected via the link mechanism 6 to be lifted up/down. Further, a power is transmitted via the PTO shaft 9 to the rotary cultivator unit. With these, the tractor is constituted as a riding type cultivator, or various kinds of utility implements can be connected thereto to be liftable and drivable, thus constituting various kinds of riding type work machines.

The vehicle body frame 5 includes the engine section 3 having an engine 3a, an intermediate case 7 having a front end thereof connected to the rear portion of the engine 3a, and a transmission case 8 having a front end thereof connected to the rear end portion of the intermediate case 7.

Figure 2:
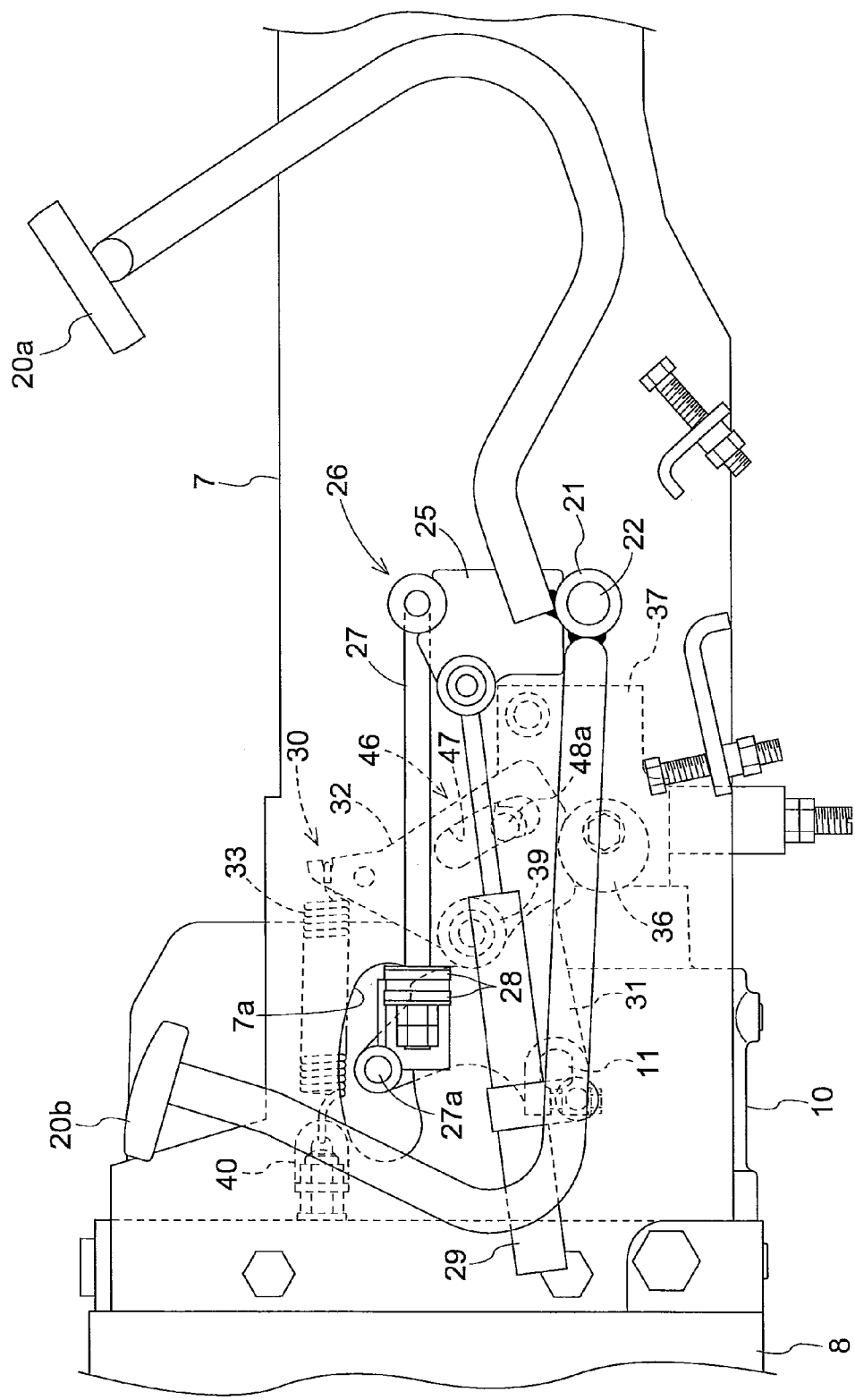
FIG. 2 is a side view showing a speed change operation apparatus for a hydrostatic stepless speed changer device.

As shown in FIG. 1 and FIG. 2, to the front portion of the transmission case 8, the HST 10 is mounted as being disposed inside the intermediate case 7. The HST 10 is configured to convert drive force transmitted from the engine 3a via a transmission shaft (not shown) mounted in the intermediate case 7 into a forward travel drive force and a reverse travel drive force and to transmit these to a transmission unit (not shown) mounted within the transmission case 8.

As shown in FIG. 1, in the driving section 4, a forward travel pedal 20a and a reverse travel pedal 20b are disposed laterally outside of the intermediate case 7. As shown in FIG. 2, the forward travel pedal 20a and the reverse travel pedal 20b are pivoted to the intermediate case 7, via a support shaft 22 on which a boss portion 21 provided at the base portions of the forward travel pedal 20a and the reverse travel pedal 20b are engaged and are operably coupled to a trunnion shaft 11 (see FIG. 3) of the HST 10 via a coupling mechanism 26 having a pivotal arm 25 provided on the boss portion 21 to be rotatable therewith.

Therefore, when the forward travel pedal 20a is stepped on about the axis of the support shaft 22, the HST 10 is speed-changed to the forward travel state to transmit the forward travel driving force to the front wheels 1 and the rear wheels 2, whereby the self-propelled vehicle body travels forward. When the reverse travel pedal 20b is stepped on about the axis of the support shaft 22, the HST 10 is speed-changed to the reverse travel state to transmit the reverse travel driving force to the front wheels 1 and the rear wheels 2, whereby the self-propelled vehicle body travels in reverse.

Figure 3:
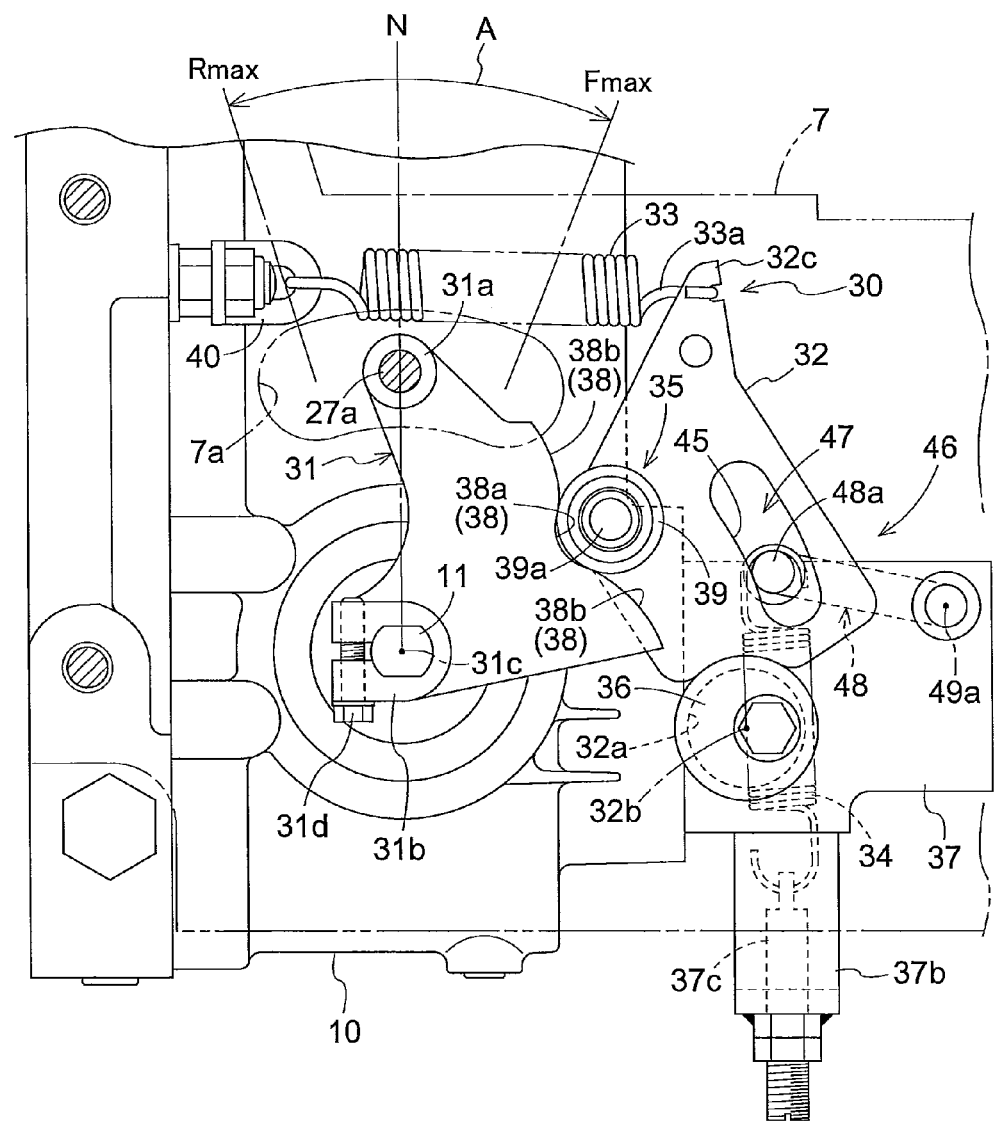
FIG. 3 is a side view showing a neutral urging mechanism under a condition when a trunnion shaft is operated to the neutral position.
Figure 6:
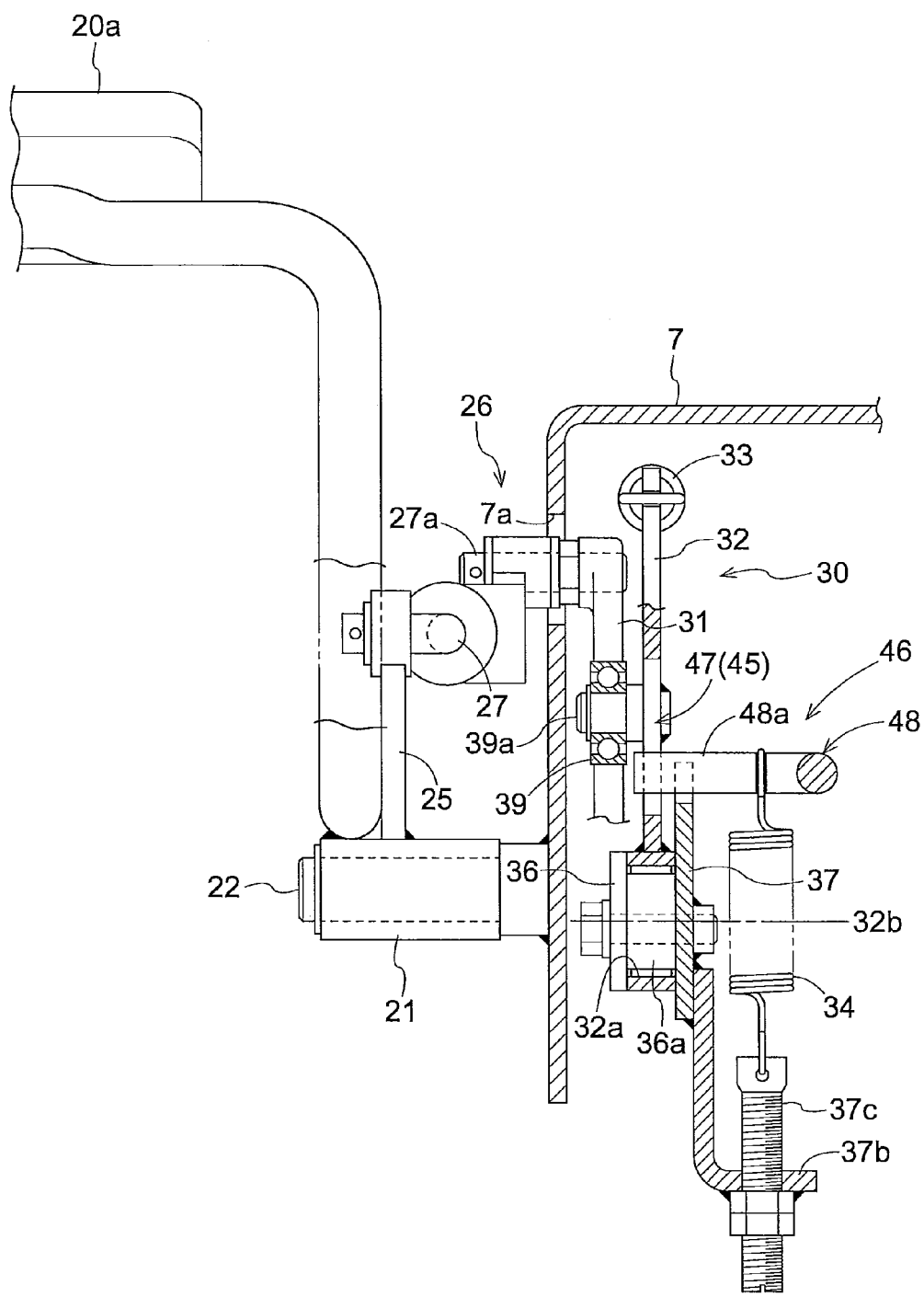
FIG. 6 is a front view in vertical section showing the neutral urging mechanism.

As shown in FIG. 2, the boss portion 21 of the forward travel pedal 20a and the reverse travel pedal 20b is provided as a common boss portion shared by the forward travel pedal 20a and the reverse travel pedal 20b, thus operably coupling the forward travel pedal 20a and the reverse travel pedal 20b with each other. As shown in FIG. 2, FIG. 3 and FIG. 6, the coupling mechanism 26 for coupling the forward travel pedal 20a and the reverse travel pedal 20b with the trunnion shaft 11 of the HST 10 includes the pivotal arm 25, a pivotal body 31 operably coupled to the trunnion shaft 11, and a coupling rod 27 having one end thereof pivotally connected to the free end of the pivotal body 31 via a coupling shaft 27a and having the other end thereof pivotally connected to the free end of the pivotal arm 25. The coupling rod 27 is disposed outside the intermediate case 7. The coupling shaft 27a coupling the coupling rod 27 with the pivotal body 31 extends through an arcuate through hole 7a provided in the intermediate case 7 and centered about the rotational axis of the trunnion shaft 11. At the terminal end of the coupling rod 27 connected to the pivotal body 31, there is provided an anti-vibration rubber 28 for restraining transmission of vibration from the trunnion shaft 11 to the forward travel pedal 20a and the reverse travel pedal 20b. To the pivotal arm 25, there is connected a dumper 29 for preventing too-rapid returning of the forward travel pedal 20a and the reverse travel pedal 20b to the neutral positions.

As shown in FIG. 3, the core component of the speed change operation apparatus for operating the HST 10 is the neutral urging mechanism 30 incorporating the pivotal body 31. The neutral urging mechanism 30 urges the trunnion shaft 11 to return it to the neutral position [N] when the HST 10 is speed-changed to the forward travel state, i.e. when the trunnion shaft 11 is operated to an operational position offset toward one side (forward travel side) in its operational range A relative to the neutral position [N]. Whereas, when the HST 10 is operated to the neutral state, the neutral urging mechanism 30 fixes the trunnion shaft 11 at the neutral position [N] so that the shaft 11 is not to be displaced from this neutral position [N].

Next, the neutral urging mechanism 30 will be described in greater details.

Figure 5:
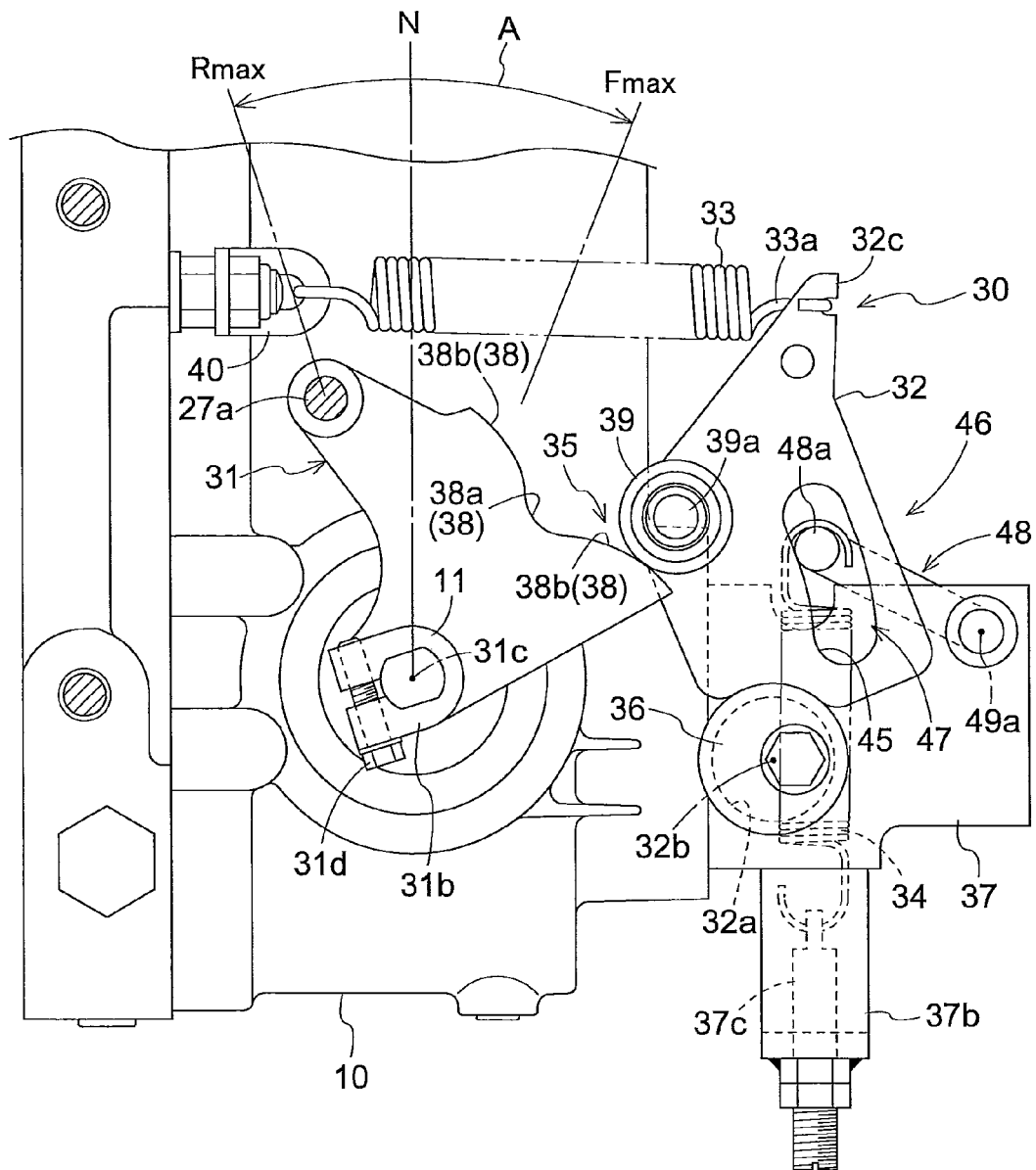
FIG. 5 is a side view showing the neutral urging mechanism under a condition when the trunnion shaft is operated to the highest speed position on the reverse travel side.

As shown in FIG. 3 and FIG. 5, the neutral urging mechanism 30 includes, in addition to the pivotal body 31, a positioning body 32 disposed on the opposite side to the side of the trunnion shaft 11 relative to the pivotal body 31, a first spring 33 disposed upwardly of the pivotal body 31 and operably coupled to the positioning body 32, a second spring 34 disposed forwardly of the pivotal body 31 and operably coupled to the positioning body 32, and a cam mechanism 35 provided between and across the positioning body 32 and the pivotal body 31.

The pivotal body 31 is connected to the trunnion shaft 11 via a connecting portion 31b provided at the base of this pivotal body 31, so that the pivotal body 31 is pivoted in operative connection with the trunnion shaft 11 with a rotational axis of the trunnion shaft 11 acting as a pivotal axis 31c. The connecting portion 31b of the pivotal body 31 is connected and fastened to an end of the trunnion shaft 11 by means of a fastening bolt 31d.

Figure 7:
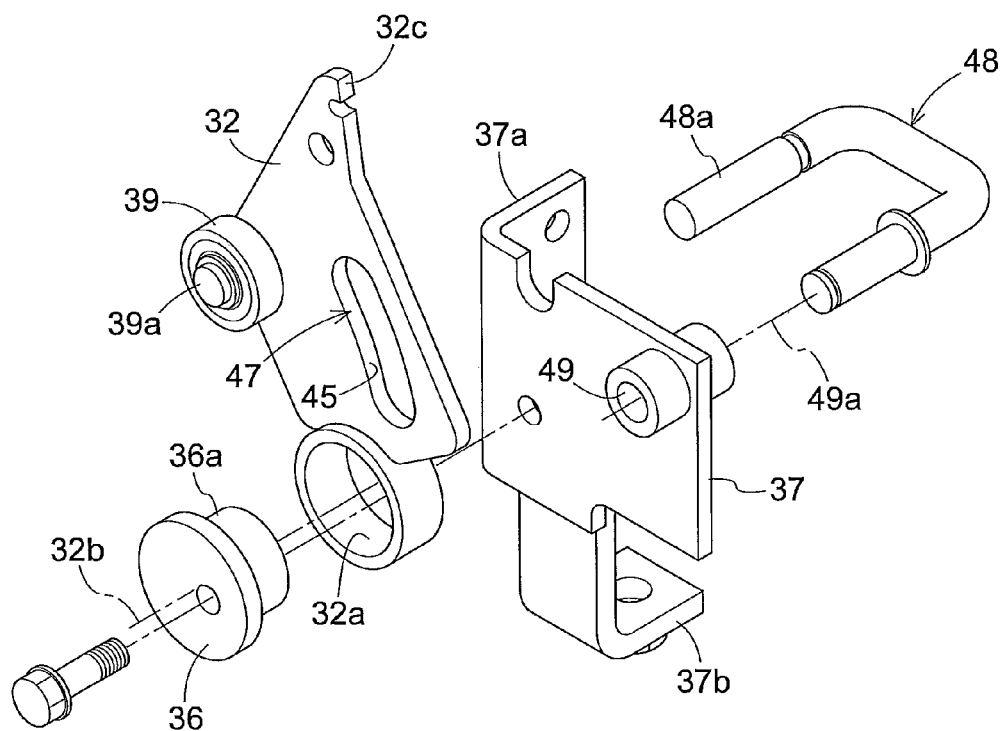
FIG. 7 is a perspective view showing a positioning body, a coupling body, a supporting member and an urging body.

As shown in FIG. 3 and FIG. 6, the positioning body 32 is supported to the supporting member 37 via a coupling body 36 (see FIG. 7) having its support portion 36a rotatably engaged within a circular attaching hole 32a (see FIG. 7) provided at the base of the positioning body 32, and the positioning body 32 pivots about a positioning axis 32b extending through the center of the attaching hole 32a and parallel with the pivotal axis 31c of the pivotal body 31. The supporting member 37 includes a connecting portion 37a (see FIG. 7) formed by a bent end portion provided at the rear end of the supporting member 37 and the supporting member 37 is attached via this connecting portion 37a to the case of the HST 10.

As shown in FIG. 3, the cam mechanism 35 includes a cam 38 formed in an end face of the pivotal body 31 and a roller-shaped cam follower 39 formed in the positioning body 32 by attaching a bearing via a support shaft 39a. The cam 38 is configured such that the cam follower 39 is slid in association with a pivotal movement of the pivotal body 31. The cam 38 includes a pair of inclined cam faces 38b, 38b having a gentle slope angle provided in distribution to one end and the other end of the cam follower 39 in the sliding direction and a recessed portion 38a disposed between the pair of inclined cam faces 38b, 38b and recessed toward the side where the pivotal axis 31c is located.

Figure 9:
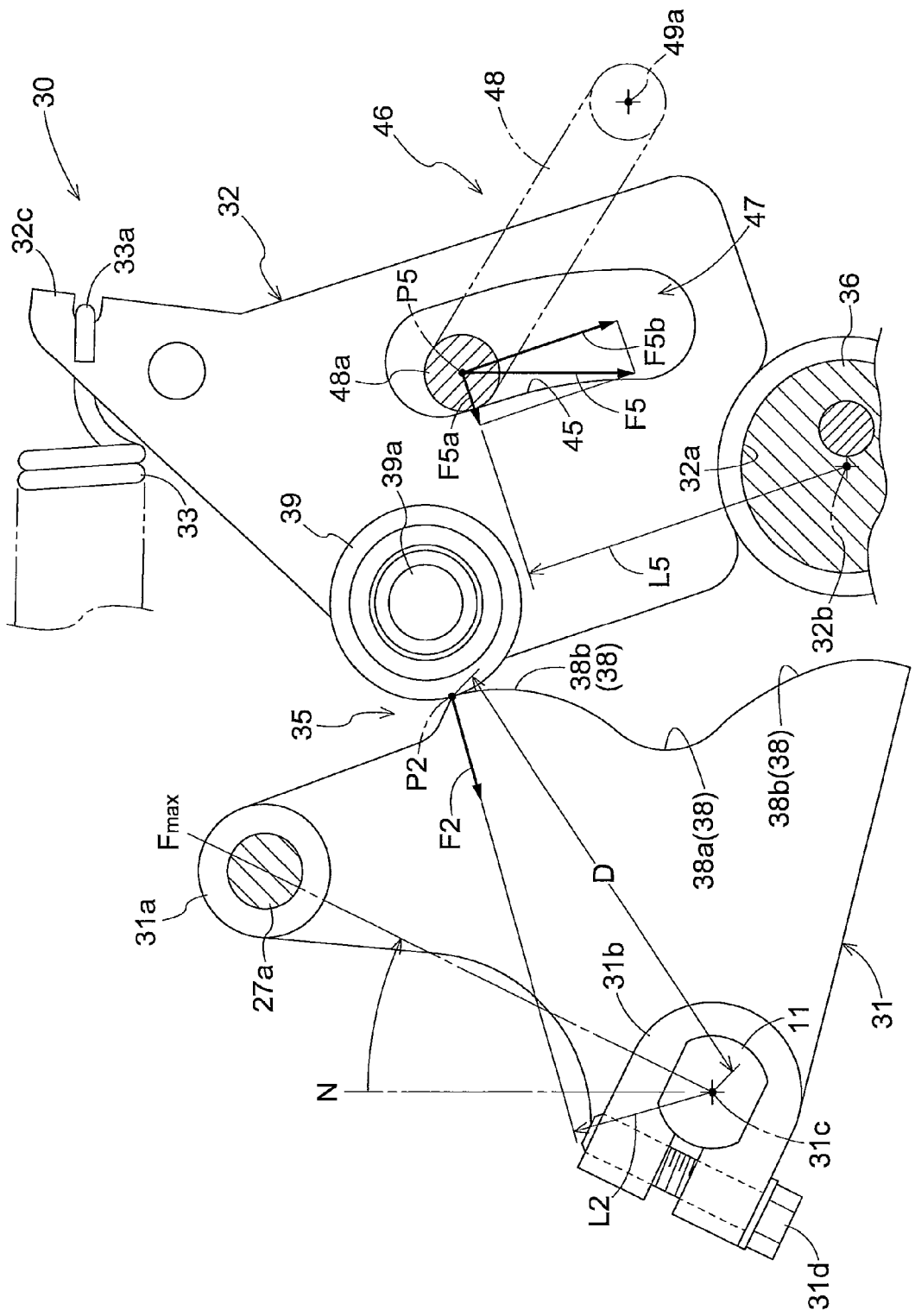
FIG. 9 is an explanatory view showing an operational state of the neutral urging mechanism when the trunnion shaft is operated to the highest speed position on the forward travel side.
Figure 10:
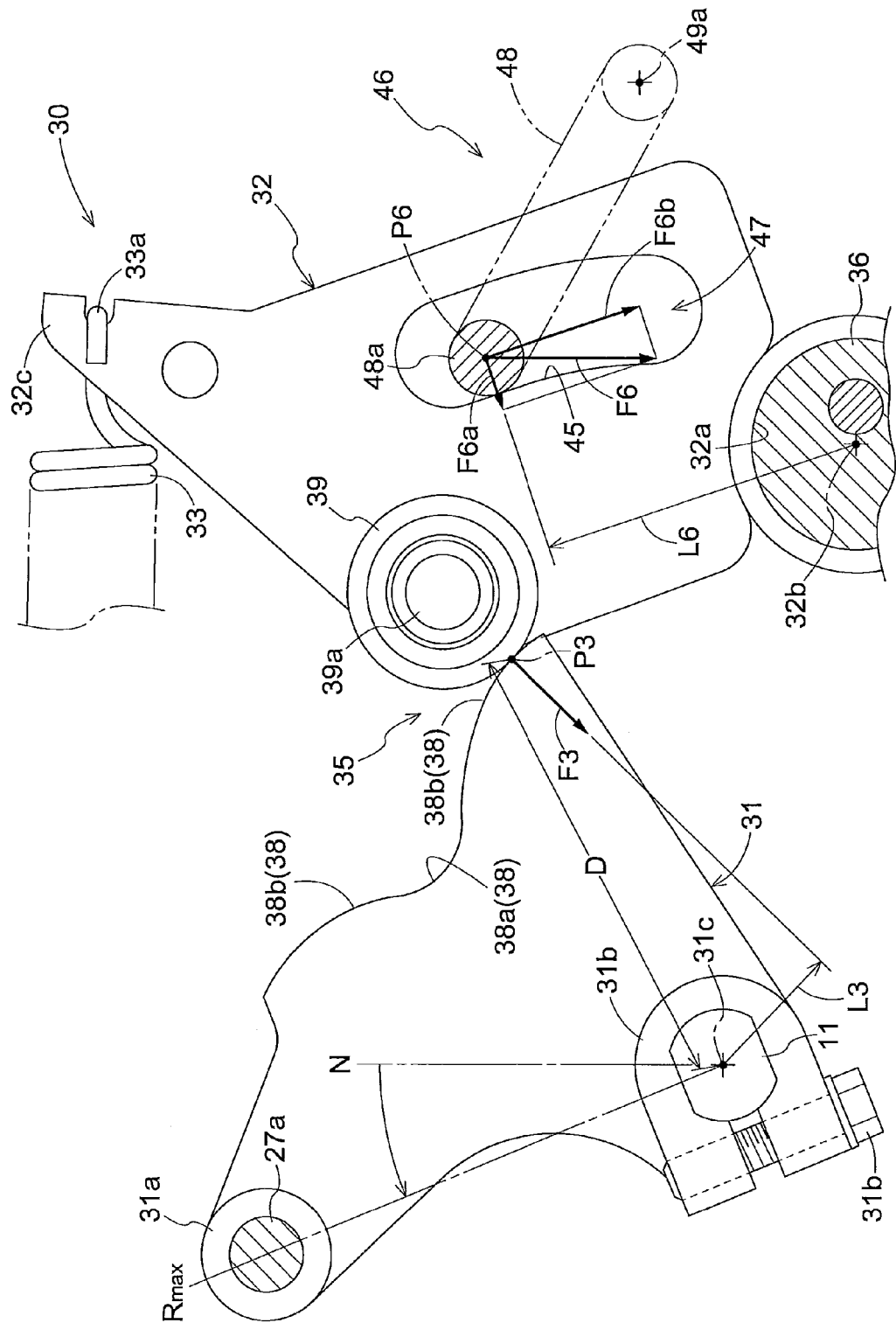
FIG. 10 is an explanatory view showing an operational state of the neutral urging mechanism when the trunnion shaft is operated to the highest speed position on the reverse travel side.
Figure 11:
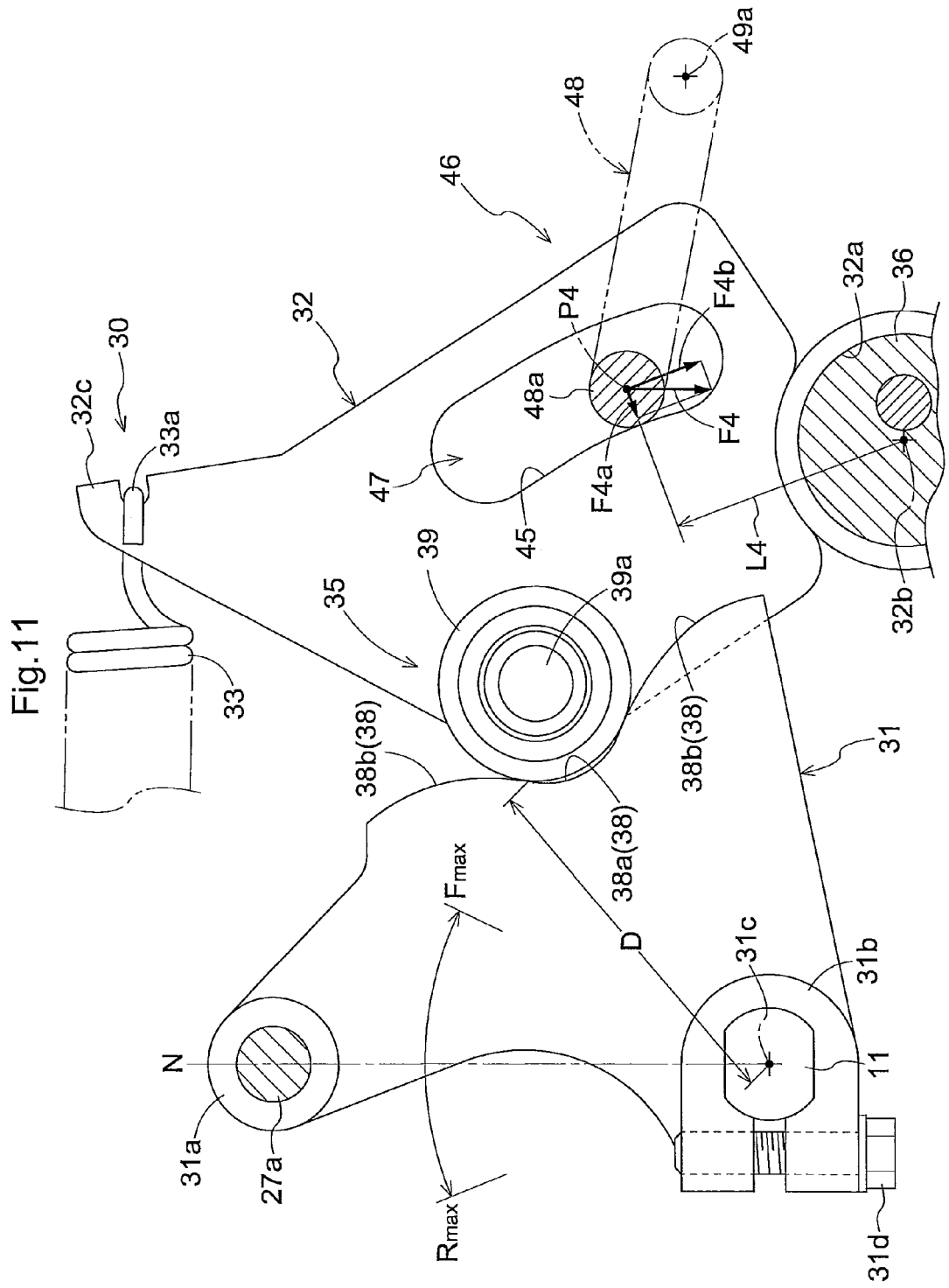
FIG. 11 is an explanatory view showing an operational state of the neutral urging mechanism when the trunnion shaft is operated to the neutral position.

As shown in FIG. 9, FIG. 10 and FIG. 11, the forward travel side and reverse travel side inclined cam faces 38b are formed with such inclinations that a distance D from a portion of the inclined cam face 38b contacting or tangent to the cam follower 39 to the pivotal axis 31c of the pivotal body 31 progressively increases as the cam follower 39 moves from the neutral position [N] to the highest speed position [Fmax], [Rmax] and also the distance becomes maximum when the cam follower 39 reaches the highest speed position [Fmax], [Rmax]. Further, the inclined cam faces are formed as a shape downwardly inclined toward the recessed portion 38a relative to the normal at the portion contacted by the cam follower 39 at the highest speed position [Fmax], [Rmax], or any other speed position.

As the cam follower 39 of the positioning body 32 engages into the recessed portion 38a of the cam 38, the cam mechanism 35 fixedly positions the trunnion shaft 11 at the neutral position [N] by fixedly positioning the pivotal body 31 at its pivotal position corresponding to the neutral position [N] of the trunnion shaft 11.

One end of the first spring 33 is supported to a spring supporting portion 40 provided in the case of the HST 10. A hook 33a provided at the other end of the first spring 33 is engaged with an engaging portion provided at a free end 32c of the positioning body 32 and the other end of the first spring 33 is connected to the free end 32c of the positioning body 32, and the first spring 33 pivotally urges the positioning body 32 about the positioning axis 32b so as to bring the cam follower 39 and the cam 38 into contact with each other.

As shown in FIG. 3 and FIG. 6, one end of the second spring 34 is supported to a spring supporting portion 37c with providing a spring adjusting screw to a lower portion 37b of the supporting member 37. The other end of the second spring 34 is connected to the positioning body 32 with connecting means 46 having a driven cam 45 formed in the positioning body 32.

The connecting means 46 includes, in addition to the driven cam 45, an urging body 48 (see FIG. 7) having, at its free end, a bent portion 48a ("free end portion 48a" hereinafter) engaged into an elongate-hole like supporting hole 47 provided in the positioning body 32 to form a cam face for the driven cam 45.

The driven cam 45 is constituted from an inner wall of the supporting hole 47. The urging body 48 is attached to the supporting hole 47 of the positioning body and an attaching hole 49 (see FIG. 9) provided in the supporting member 37 and the urging body 48 pivots with the free end 48a sliding along the driven cam 45, about a pivotal axis 49a which is the axis extending through the center of the attaching hole 49. The urging body 48 has its free end 48a connected to the second spring 34 so that the urging body 48 is pivotally urged about the pivot axis 49a by the second spring 34. By the urging force of the second spring 34, the free end 48a is pressed against the driven cam 45, and the positioning body 32 is pivotally urged about the positioning axis 32b so as to bring the cam follower 39 and the cam 38 into contact with each other.

Therefore, with the neutral urging mechanism 30 in operation, the pivotal body 31 is caused to provide the pressing action with the pivotal urging of the positioning body 32 by the first spring 32 and the pivotal urging via the connecting means 46 by the second spring 34. And, when the trunnion shaft 11 is rotatably operated, the cam follower 39 is caused to slide relative to the cam 38 to come into engagement into the recessed portion 38a or to disengage from the recessed portion 38a to be positioned at the forward travel side or reverse travel side inclined cam face 38b, thereby to fixedly position the trunnion shaft 11 at the neutral position [N] or to return it to the neutral position [N].

That is, FIG. 3 is a side view showing the neutral urging mechanism 30 under the condition where the trunnion shaft 11 is operated to the neutral position [N]. As shown in this figure, with the neutral urging mechanism 30 in operation, when the trunnion shaft 11 is operated to the neutral position [N], the pivotal body 31 pivots in operative association with the trunnion shaft 11, so that the cam follower 39 of the positioning body 32 and the recessed portion 38a of the cam 38 are brought into opposition to each other, and with the pivotal urging by the first spring 33 and the second spring 34, the positioning body 32 urges the cam follower 39 into engagement in the recessed portion 38a, thereby to fixedly position the trunnion shaft 11 at the neutral position [N].

Figure 4:
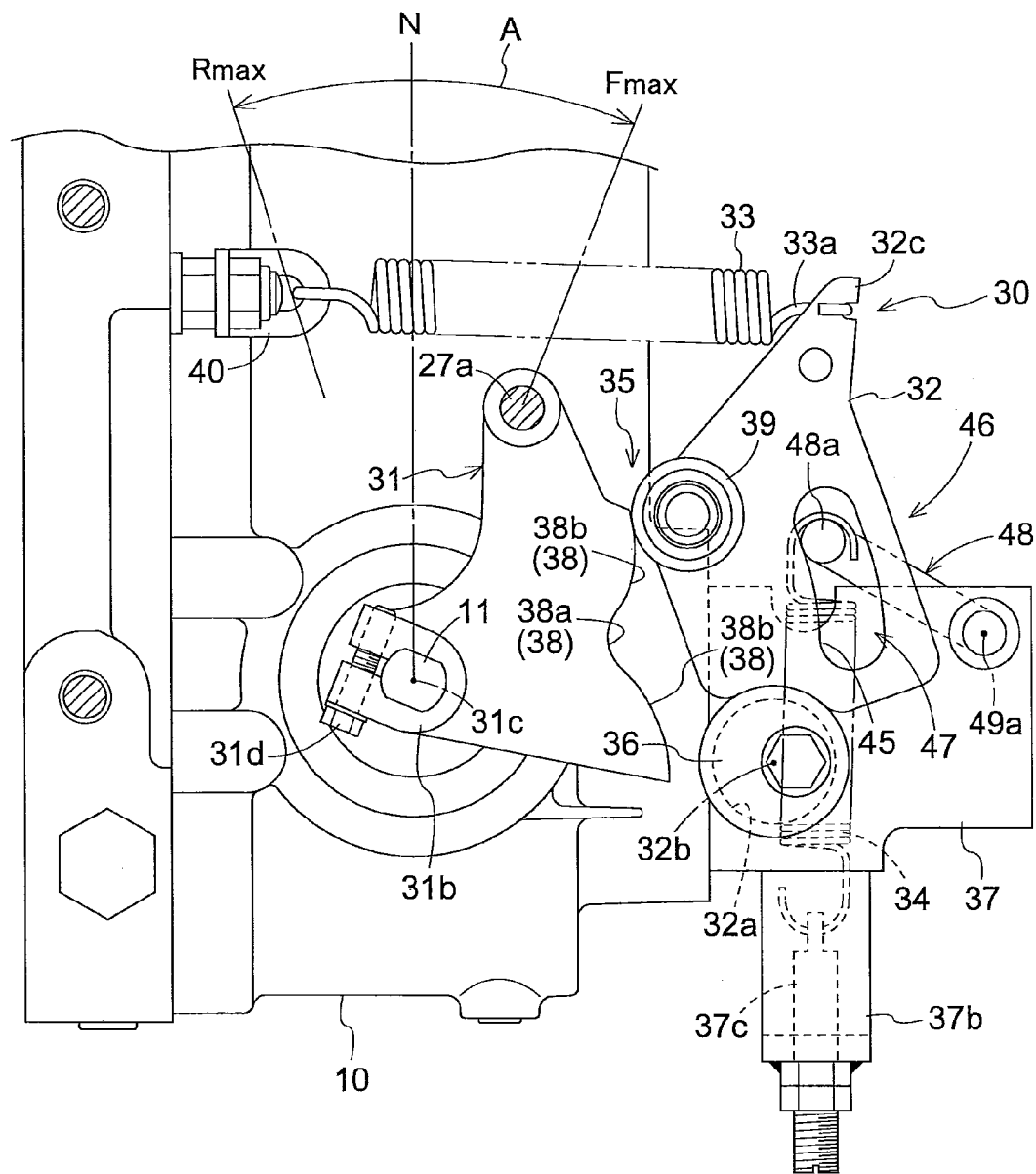
FIG. 4 is a side view showing the neutral urging mechanism under a condition when the trunnion shaft is operated to the highest speed position on the forward travel side.

FIG. 4 is a side view showing the neutral urging mechanism 30 under the condition when the trunnion shaft 11 is operated to the forward travel side highest speed position [Fmax]. As shown in this figure, with the neutral urging mechanism 30 in operation, when the trunnion shaft 11 is operated to the forward travel side highest speed position [Fmax], the pivotal body 31 pivots in operative association with the trunnion shaft 11, so that the cam follower 39 of the positioning body 32 disengages from the recessed portion 38a of the cam 38 and comes into opposition to the forward travel side inclined cam face 38b and the positioning body 32, as being pivotally urged by the first spring 33 and the second spring 34, presses the cam follower 39 against the forward travel side inclined cam face 38b, thus urging the trunnion shaft 11 to be returned to the neutral position [N]. Though not shown, when the trunnion shaft 11 is operated to an operational position of a speed before the forward travel side highest speed position [Fmax], like the case of the trunnion shaft 11 being operated to the highest speed position [Fmax], the neutral urging mechanism 30 operates such that the positioning body 32 presses the cam follower 39 against the forward travel side inclined cam face 38b, thus urging the trunnion shaft 11 to be returned to the neutral position [N].

FIG. 5 is a side view showing the neutral urging mechanism 30 under the condition when the trunnion shaft 11 is operated to the reverse travel side highest speed position [Rmax]. As shown in this figure, with the neutral urging mechanism 30 in operation, when the trunnion shaft 11 is operated to the reverse travel side highest speed position [Rmax], the pivotal body 31 pivots in operative association with the trunnion shaft 11, so that cam follower 39 of the positioning body 32 disengages from the recessed portion 38a of the cam 38 and comes into opposition to the reverse travel side inclined cam face 38b and the positioning body 32, as being pivotally urged by the first spring 33 and the second spring 34, presses the cam follower 39 against the reverse travel side inclined cam face 38b, thus urging the trunnion shaft 11 to be returned to the neutral position [N]. Though not shown, when the trunnion shaft 11 is operated to an operational position of a speed before the reverse travel side highest speed position [Rmax], like the case of the trunnion shaft 11 being operated to the highest speed position [Rmax], the neutral urging mechanism 30 operates such that the positioning body 32 presses the cam follower 39 against the reverse travel side inclined cam face 38b, thus urging the trunnion shaft 11 to be returned to the neutral position [N].

Figure 8:
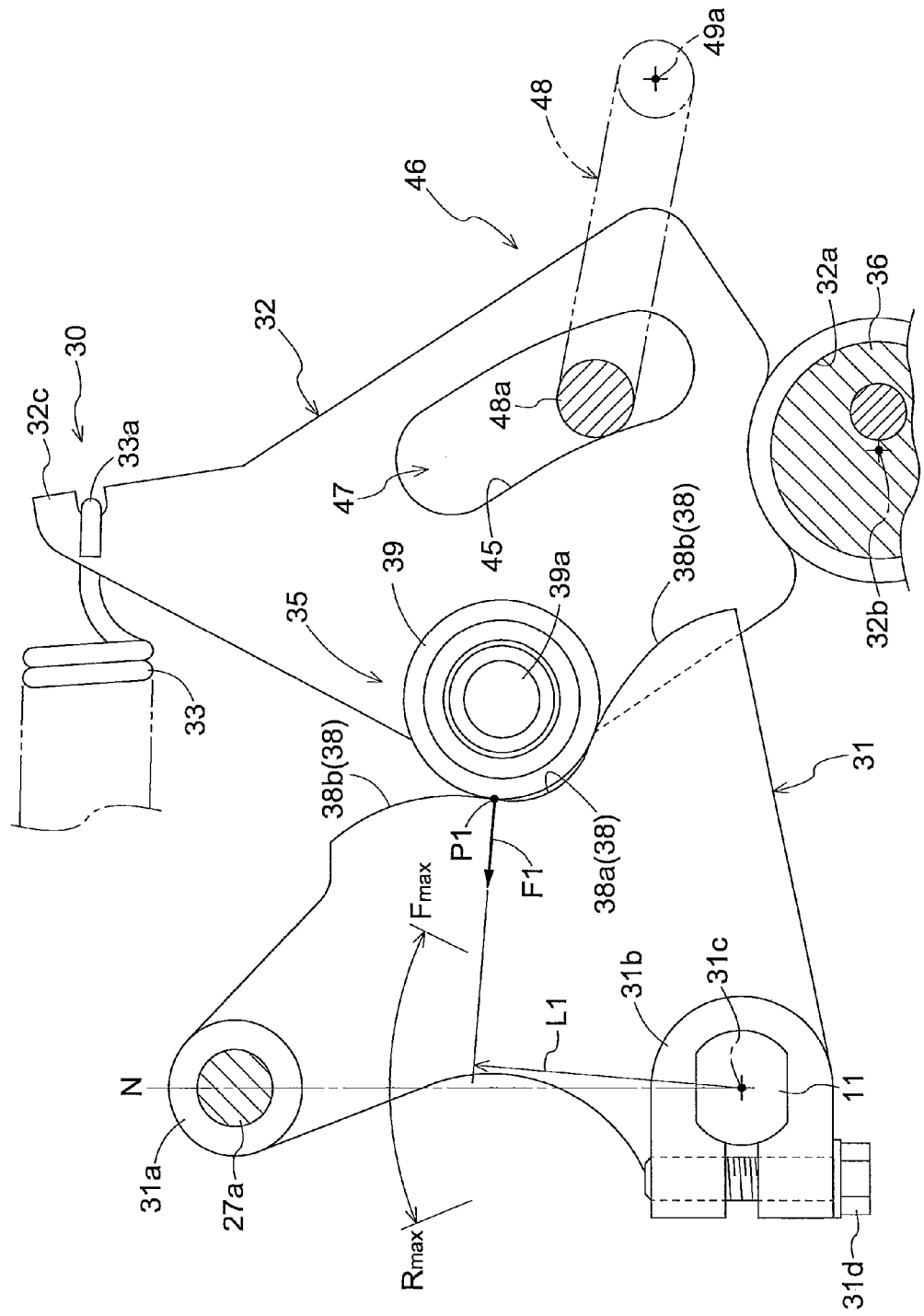
FIG. 8 is an explanatory view showing an operational state of the neutral urging mechanism when a cam follower disengages from a recessed portion.

FIG. 8 is an explanatory view showing an operational state of the neutral urging mechanism 30 when the cam follower 39 disengages from the recessed portion 38a of the cam 38 toward the forward travel side. As shown in this figure, when the cam follower 39 disengages from the recessed portion 38a of the cam 38 toward the forward travel side, the cam follower 39 comes into contact with the forward travel side entrance/exit of the recessed portion 38a of the cam 38, so that a pressing force F1 of the first spring 33 is applied to a position P1 located at the forward travel side entrance/exit of the recessed portion 38a and having an arm length L1 from the pivotal axis 31c of the pivotal body 31, whereby the trunnion shaft 11 is subjected to a pressing moment M1=arm length L1×pressing force F1, about the pivotal axis 31c, as a rotational resistance due to the pivotal urging of the positioning body 32 by the first spring 33.

When the cam follower 39 disengages from the recessed portion 38a of the cam 38 toward the reverse travel side, the cam follower 39 comes into contact with the reverse travel side entrance/exit of the recessed portion 38a of the cam 38. In this, the portion of the cam 38 contacted by the cam follower 39 differs from that when the cam follower 39 disengages from the recessed portion 38a toward the forward travel side. As the shape of the recessed portion 38a is same on the side of the forward travel side entrance/exit and on the side of the reverse travel side entrance/exit, when the cam follower 39 disengages from the recessed portion 38a toward the reverse travel side, the trunnion shaft 11 receives a pressing moment M1 about the pivotal axis 31c, as a rotational resistance of substantially same strength as that the shaft 11 receives when the cam follower 39 disengages from the recessed portion 38a toward the forward travel side.

FIG. 9 is an explanatory view showing the operational condition of the neutral urging mechanism 30 when the trunnion shaft 11 is operated to the forward travel side highest speed position [Fmax]. As shown in this figure, when the trunnion shaft 11 is operated to the forward travel side highest speed position [Fmax], the cam follower 39 comes into contact with an end portion of the forward travel side inclined cam face 38b, so that a pressing force F2 of the first spring 33 is applied to a position P2 located at the forward travel side entrance/exit of the recessed portion 38a and having an arm length L2 from the pivotal axis 31c of the pivotal body 31, whereby the trunnion shaft 11 is subjected to a pressing moment M2=arm length L2×pressing force F2, about the pivotal axis 31c, as a rotational resistance due to the pivotal urging of the positioning body 32 by the first spring 33.

FIG. 10 is an explanatory view showing the operational condition of the neutral urging mechanism 30 when the trunnion shaft 11 is operated to the reverse travel side highest speed position [Rmax]. As shown in this figure, when the trunnion shaft 11 is operated to the reverse travel side highest speed position [Rmax], the cam follower 39 comes into contact with an end portion of the reverse travel side inclined cam face 38b, so that a pressing force F3 of the first spring 33 is applied to a position P3 located at the reverse travel side entrance/exit of the recessed portion 38a and having an arm length L3 from the pivotal axis 31c of the pivotal body 31, whereby the trunnion shaft 11 is subjected to a pressing moment M3=arm length L3×pressing force F3, about the pivotal axis 31c, as a rotational resistance due to the pivotal urging of the positioning body 32 by the first spring 33.

The extension lengths of the first spring 33 when the trunnion shaft 11 is operated to the forward travel side highest speed position [Fmax] and the reverse travel highest speed position [Rmax] are greater than the extension length of the first spring 33 when the cam follower 39 disengages from the recessed portion 38a. However, the arm length L2 when the trunnion shaft 11 is operated to the forward travel side highest speed position [Fmax] and the arm length L3 when the trunnion shaft 11 is operated to the reverse travel side highest speed position [Rmax] are significantly shorter than the arm length L1 when the cam follower 39 disengages from the recessed portion 38a. And, the pressing moment M2 as the rotational resistance received by the trunnion shaft 11 when the trunnion shaft 11 is operated to the forward travel side highest speed position [Fmax] and the pressing moment M3 as the rotational resistance received by the trunnion shaft 11 when the trunnion shaft 11 is operated to the reverse travel side highest speed position [Rmax] are smaller than the pressing moment M1 as the rotational resistance received by the trunnion shaft 11 when the cam follower 39 disengages from the recessed portion 38a.

The extension lengths of the first spring 33 when the trunnion shaft 11 is operated to the forward travel side highest speed position [Fmax] and the extension lengths of the first spring 33 when the trunnion shaft 11 is operated to the reverse travel highest speed position [Rmax] are substantially same. The arm length L2 when the trunnion shaft 11 is operated to the forward travel side highest speed position [Fmax] and the arm length L3 when the trunnion shaft 11 is operated to the reverse travel highest speed position [Rmax] are substantially same.

Therefore, as the trunnion shaft 11 is rotatably operation, the rotational resistance of the trunnion shaft 11 that occurs in association with the pivotal urging of the positioning body 32 by the first spring 33 varies over the entire pivotal range A of the trunnion shaft 11, due to the effect of the cam 38 that is rotated in operative connection with the trunnion shaft 11. Hence, whether the trunnion shaft 11 is rotatably operated from the neutral position [N] to the forward travel side or the reverse travel side, the rotational resistance becomes maximum when the cam follower 39 disengages from the recessed portion 38a and becomes smaller as the cam follower 39 moves away from the recessed portion 38a after its disengagement therefrom.

FIG. 11 is an explanatory view showing the operational condition of the neutral urging mechanism 30 when the trunnion shaft 11 is operated to the neutral position [N]. As shown in this figure, when the trunnion shaft 11 is operated to the neutral position [N], the free end 48a of the urging body 48 is located at a position P4 having an arm length L4 from the positioning axis 32b of the positioning body 32, so that the urging body 48 applies an operational force F4 of the second spring 34 to the position P4 of the positioning body 32. This operational force F4 of the second spring 34 is divided into a component force F4a for pivotally urging the positioning body 32 about the positioning axis 32b and a component force F4b that does not affect the pivotal urging of the positioning body 32. Therefore, under the condition of the trunnion shaft 11 being located at the neutral position [N], the positioning body 32 has a pressing moment M4=arm length L4×component force F4a, about the positioning axis 32b, as a pressing force for pressing the pivotal body 31 due to the pivotal urging by the second spring 34.

As shown in FIG. 9, when the trunnion shaft 11 is operated to the forward travel side highest speed position [Fmax], the free end 48a of the urging body 48 is located at a position P5 having an arm length L5 from the positioning axis 32b of the positioning body 32, so that the urging body 48 applies an operational force F5 of the second spring 34 to the position P5 of the positioning body 32. This operational force F5 of the second spring 34 is divided into a component force F5a for pivotally urging the positioning body 32 about the positioning axis 32b and a component force F5b that does not affect the pivotal urging of the positioning body 32. Therefore, under the condition of the trunnion shaft 11 being located at the neutral position [N], the positioning body 32 has a pressing moment M5=arm length L5×component force F5a, about the positioning axis 32b, as a pressing force for pressing the pivotal body 31 due to the pivotal urging by the second spring 34.

As shown in FIG. 10, when the trunnion shaft 11 is operated to the reverse travel side highest speed position [Rmax], the free end 48a of the urging body 48 is located at a position P6 having an arm length L6 from the positioning axis 32b of the positioning body 32, so that the urging body 48 applies an operational force F6 of the second spring 34 to the position P6 of the positioning body 32. This operational force F6 of the second spring 34 is divided into a component force F6a for pivotally urging the positioning body 32 about the positioning axis 32b and a component force F6b that does not affect the pivotal urging of the positioning body 32. Therefore, under the condition of the trunnion shaft 11 being located at the neutral position [N], the positioning body 32 has a pressing moment M6=arm length L6×component force F6a, about the positioning axis 32b, as a pressing force for pressing the pivotal body 31 due to the pivotal urging by the second spring 34.

When the trunnion shaft 11 is operated to the forward travel side highest speed position [Fmax] and the reverse travel side highest speed position [Rmax], the free end 48a of the urging body 48 is located at positions having greater distances from the spring supporting portion 37c than the case of the trunnion shaft 11 being operated to the neutral position [N], so that the second spring 34 is extended greater than the case of the trunnion shaft 11 being operated to the neutral position [N], and the operational forces F5, F6 of the second spring 34 in the cases of the trunnion shaft 11 being operated to the forward travel side highest speed position [Fmax] and the reverse travel side highest speed position [Rmax] are greater than the operational force F4 in the case of the trunnion shaft 11 being operated to the neutral position [N]. Further, the arm lengths L5, L6 when the trunnion shaft 11 is operated to the forward travel side highest speed position [Fmax] and the reverse travel side highest speed position [Rmax] are greater than the arm length L4 in the case of the trunnion shaft 11 being operated to the neutral position [N]. And, the pressing moment M5 present in the positioning body 32 when the trunnion shaft 11 is operated to the forward travel side highest speed position [Fmax] and the pressing moment M6 present in the positioning body 32 when the trunnion shaft 11 is operated to the reverse travel side highest speed position [Rmax] are greater than the pressing moment M4 present in the case of the trunnion shaft 11 being operated to the neutral position [N].

The free end 48a of the urging body 48 is located at substantially same position of the positioning body 32 when the trunnion shaft 11 is operated to the forward travel side highest speed position [Fmax] and when the trunnion shaft 11 is operated to the reverse travel side highest speed position [Rmax]; and the pressing moment M5 present in the positioning body 32 when the trunnion shaft 11 is operated to the forward travel side highest speed position [Fmax] and the pressing moment M6 present in the positioning body 32 when the trunnion shaft 11 is operated to the reverse travel side highest speed position [Rmax] are pressing moments of substantially same strength.

Therefore, due to the function of the connecting means 46, the pressing force applied by the positioning body 32 to press the pivotal body 31 with the pivotal urging of the positioning body 32 by the second spring 34 is minimum under the condition when the trunnion shaft 11 is located at the neutral position [N], and the pressing force becomes greater as the trunnion shaft 11 moves closer to the forward travel side highest speed position [Fmax] and the reverse travel side highest speed position [Rmax], thus, the pressing force is varied over the entire operational range A of the trunnion shaft 11.

FIG. 12 is an explanatory view showing relationship among the pressing forces (the pressing forces F1, F2, F3 applied by the first spring 33) applied from the positioning body 32 to the pivotal body 31 with the pivotal urging by the first spring 33, rotational resistances M1, M2, M3 of the trunnion shaft 11 that occur in association with the pivotal urging of the positioning body 32 by the first spring 33, the component forces F4a, F5a, F6a of the operational forces of the second spring 34 for pivotally urging the positioning body 32, the pressing forces present in the positioning body 32 to pressing the pivotal body 31 with the pivotal urging by the second spring 34 (the pressing forces M4, M5, M6 of the positioning body 32) and speed change operation resistances received from the first spring 33 and the second spring 34 in the course of speed change operations by the forward travel pedal 20a and the reverse travel pedal 20b. In this figure, the magnitudes or strengths of the respective component forces, the respective rotational resistances and the respective speed change operation resistances are indicated in the form of ratios relative to the strength of the component force F5a of the operational force of the second spring 34 applied to the positioning body 32 as a reference when the trunnion shaft 11 is operated to the neutral position [N]. It should be noted; however, that the strength of the component force F5a of the operational force of the second spring 34 applied to the positioning body 32 in the case of the trunnion shaft 11 being operated to the neutral position [N] is assumed to have a value of 0.75.

As shown in this figure, with the neutral urging mechanism 30 in operation, the positioning body 32 is pivotally urged by the first spring 33 and the second spring 34 thereby to bring the cam follower 39 and the cam 38 into contact with each other and the rotational resistance generated in the trunnion shaft 11 due to the pivotal urging of the positioning body 32 by the first spring 33 is varied by the function of the cam 38 over the entire operational range A of the trunnion shaft 11 such that the resistance becomes maximum when the trunnion shaft 11 moves away from the neutral position [N] and the resistance becomes smaller as the trunnion shaft 11 approaches the forward travel side highest speed position [Fmax] and the reverse travel side highest speed position [Rmax] after its departure from the neutral position [N]. And, the pressing force present in the positioning body 32 to press the pivotal body 31 by the pivotal urging by the second spring 34 is varied by the function of the connecting means 46 over the entire operational range A of the trunnion shaft 11 such that the pressing force becomes minimum when the trunnion shaft 11 is located at the neutral position [N] and the pressing force becomes greater as the trunnion shaft 11 approaches the forward travel side highest speed position [Fmax] and the reverse travel side highest speed position [Rmax]. Hence, the operational resistance that occurs when the HST 10 is speed-changed is rendered substantially same strength over the entire operational range A of the trunnion shaft 11; and also the trunnion shaft 11 is fixedly positioned at the neutral position [N] by both the pivotal urging of the positioning body 32 by the first spring 33 and the pivotal urging of the pivotal body 32 by the second spring 34.

OTHER EMBODIMENTS (1) In the foregoing embodiment, there was explained an example using the pivotal body 31 directly connected to the trunnion shaft 11. Instead, the invention can be embodied with using a pivotal body operably coupled to the trunnion shaft 11 via a coupling mechanism including a coupling rod, a pivotal link, etc.

(2) In the foregoing embodiment, there was explained an example wherein the speed change operation resistances are rendered substantially same over the entire operational range A of the trunnion shaft 11. Instead, the invention can be embodied with using an arrangement where the speed change operation resistances are rendered substantially same over the entire operational range of the trunnion shaft 11, depending on the shapes of the driven cam, the cam follower, etc.

(3) In the foregoing embodiment, there was explained an example where the cam 38 is formed in the pivotal body 31 and the cam follower 39 is formed in the positioning body 32. Instead, the invention can be embodied with forming the cam 38 in the positioning body 32 and forming the cam follower 39 in the pivotal body 31.

The present invention can be used as a neutral urging mechanism to be incorporated in a speed change operation apparatus for a stepless speed changer device to be mounted on various kinds of vehicle, not only a tractor, but also a combine, a rice planter, a load carrying vehicle, etc.

The invention claimed is:

1. A speed change operation apparatus for a stepless speed changer device, configured to increase a rotational output in response to increase in rotational displacement of a trunnion shaft from a neutral position to an operational position, the speed change operation apparatus comprising:
an operational tool whose operational displacement causes rotational displacement of a trunnion shaft between a neutral position and an operational position;
a pivotal body operably coupled with the trunnion shaft to be pivotally displaced in response to an operational displacement of said operational tool;
a positioning body operably coupled with said pivotal body to be pivotally displaced in response to pivotal displacement of said pivotal body, wherein said pivotal body and said positioning body are operably coupled with each other via a cam mechanism, comprising a cam and a cam follower, so as to cause a pivotal displacement of the positioning body in response to a pivotal displacement of said pivotal body;
a main urging mechanism for providing an urging force to said pivotal body via said positioning body, said urging force returning said pivotal body from the operational position to the neutral position; and
an auxiliary urging mechanism for providing an auxiliary urging force to said pivotal body, said auxiliary urging force returning said pivotal body from the operational position to the neutral position;
wherein a main moment of force provided to the trunnion shaft by the main urging mechanism at the neutral position of the trunnion shaft is stronger than a main moment of force provided to the trunnion shaft by the main urging mechanism at the operational position of the trunnion shaft; and
wherein an auxiliary moment of force provided to the trunnion shaft by the auxiliary urging mechanism at the neutral position of the trunnion shaft is weaker than an auxiliary moment of force provided to the trunnion shaft by the auxiliary urging mechanism at the operational position of the trunnion shaft.

2. The speed change operation apparatus according to claim 1, wherein said auxiliary urging mechanism applies the auxiliary urging force to said pivotal body via said positioning body.

3. The speed change operation apparatus according to claim 1, wherein a speed change operation resistance force generated in said operational tool in a maximally operated position area is greater than a speed change operation resistance force generated in said operational tool at the neutral position.

4. The speed change operation apparatus according to claim 1, wherein said auxiliary urging force of the auxiliary urging mechanism is manually adjustable.

5. The speed change operation apparatus according to claim 1, wherein urging members of said main urging mechanism and said auxiliary urging mechanism are springs.

6. A speed change operation apparatus for a stepless speed changer device, configured to increase a rotational output in response to increase in rotational displacement of a trunnion shaft from a neutral position to an operational position, the speed change operation apparatus comprising:
a pivotal body operably coupled with the trunnion shaft;
a positioning body supported to be pivotable about a positioning axis extending parallel with a pivotal axis of the pivotal body;
a cam mechanism, comprising a cam and a cam follower, for positioning the trunnion shaft at the neutral position through engagement of a recessed portion of said cam and said cam follower, said cam being formed in one of the pivotal body and the positioning body, said cam follower being formed in the other of the pivotal body and the positioning body;
first and second springs that pivotally urge the positioning body in a pivotal direction for bringing the cam follower and the cam into contact with each other;
wherein said cam is configured to vary a rotational resistance of the trunnion shaft over the entire operational range of the trunnion shaft in such a manner that the rotational resistance becomes maximum when the cam follower disengages from the recessed portion and the rotational resistance progressively decreases as the cam follower moves away from the recessed portion after its disengagement therefrom; and
wherein said second spring and said positioning body are operably coupled with each other to vary a pressing force applied from the positioning body to the pivotal body through pivotal urging of the positioning body by the second spring in such a manner that the pressing force becomes minimum when the trunnion shaft is located at the neutral position and the pressing force progressively increases as the trunnion shaft approaches a highest speed position.

7. The speed change operation apparatus according to claim 6, further comprising an urging body configured to pivotally urge said positioning body as a free end of the urging body presses a driven cam formed in said positioning body, said urging body being pivotally supported with said free end thereof sliding against said driven cam in association with a pivotal movement of said positioning body, and said second spring is connected to said urging body.

* * * * *